Oct. 21, 1941.    H. HOGEMAN    2,259,693
FUEL GOVERNOR FOR INTERNAL COMBUSTION ENGINES
Filed Dec. 1, 1939    4 Sheets-Sheet 1

INVENTOR.
HANS HOGEMAN
BY
ATTORNEY.

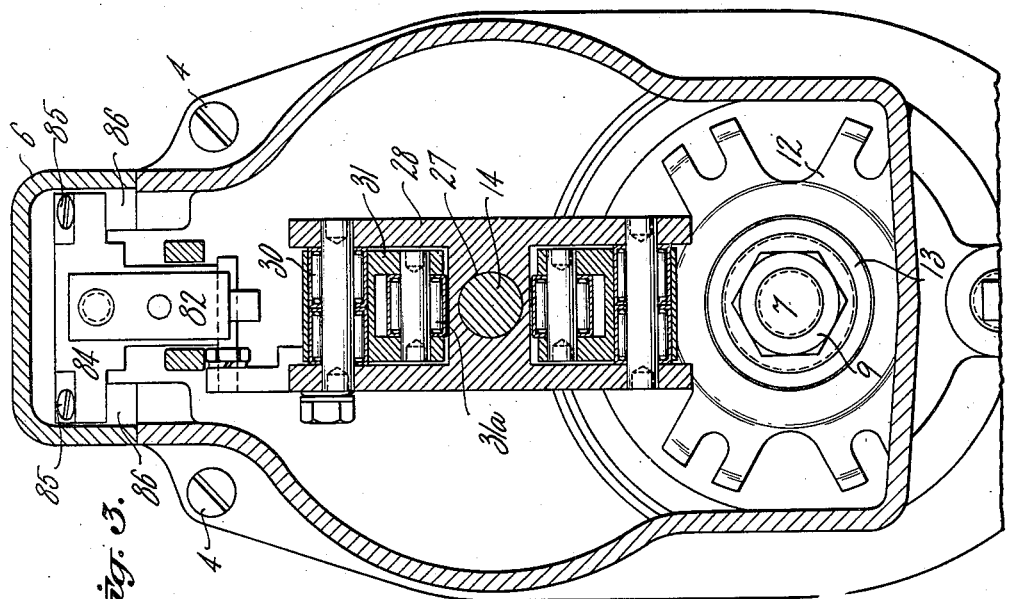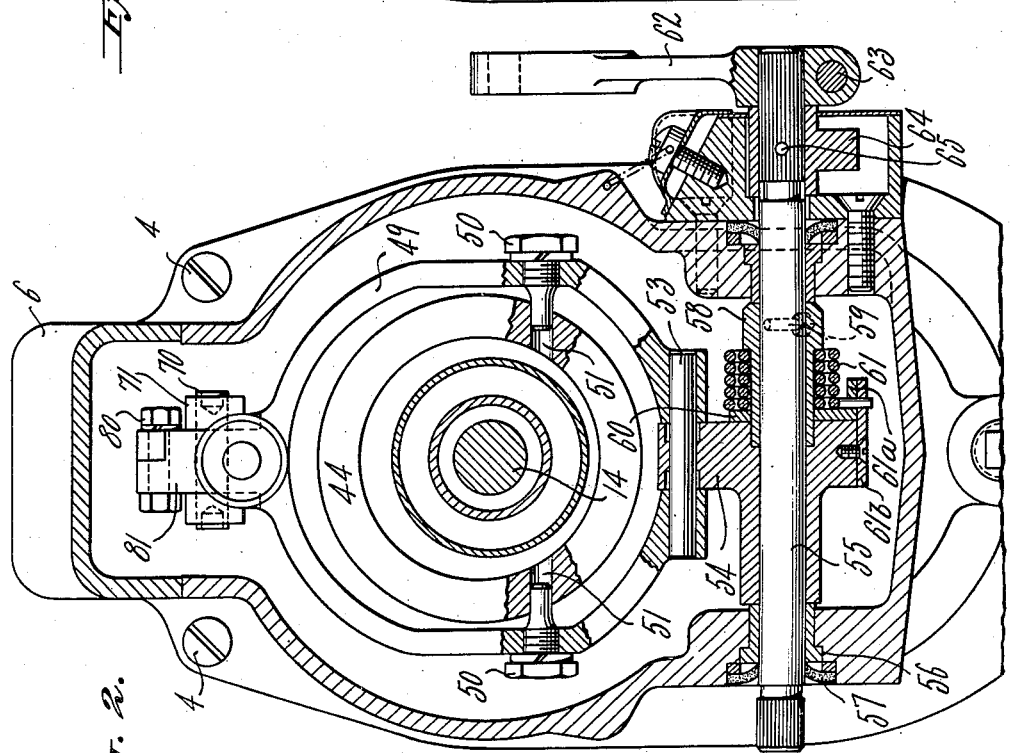

Oct. 21, 1941.   H. HOGEMAN   2,259,693
FUEL GOVERNOR FOR INTERNAL COMBUSTION ENGINES
Filed Dec. 1, 1939   4 Sheets-Sheet 3

INVENTOR.
HANS HOGEMAN
BY
ATTORNEY.

Oct. 21, 1941.　　　　H. HOGEMAN　　　　2,259,693

FUEL GOVERNOR FOR INTERNAL COMBUSTION ENGINES

Filed Dec. 1, 1939　　　　4 Sheets-Sheet 4

INVENTOR.
HANS HOGEMAN
BY
ATTORNEY.

Patented Oct. 21, 1941

2,259,693

UNITED STATES PATENT OFFICE 2,259,693

FUEL GOVERNOR FOR INTERNAL COMBUSTION ENGINES

Hans Hogeman, Springfield, Mass., assignor to American Bosch Corporation, Springfield, Mass., a corporation of New York Application December 1, 1939, Serial No. 307,058

11 Claims. (Cl. 264—4)

This invention relates to governors and particularly to centrifugal governors of the type intended to control the fuel supply of injection pumps for internal combustion engines of the solid injection type.

It is among the objects of this invention to provide a governor which may be manually adjusted for varying loads within a predetermined speed range and to provide the flexibility required of engines of this type when used for automotive purposes.

It is a further object of the invention to prevent the injection of greater quantities of fuel than can be consumed under given load and speed conditions of the engine and thus prevent smoky and incomplete combustion.

It is a further object of the invention to provide a governor control for an engine of the type mentioned which at maximum rated load will not stall as the engine speed decreases due to slight overloading.

The invention further resides in details of construction and arrangements of parts which facilitate the manufacture and assembly of the governor, while reducing production costs and promoting durability and freedom from operating defects.

Figure 1:
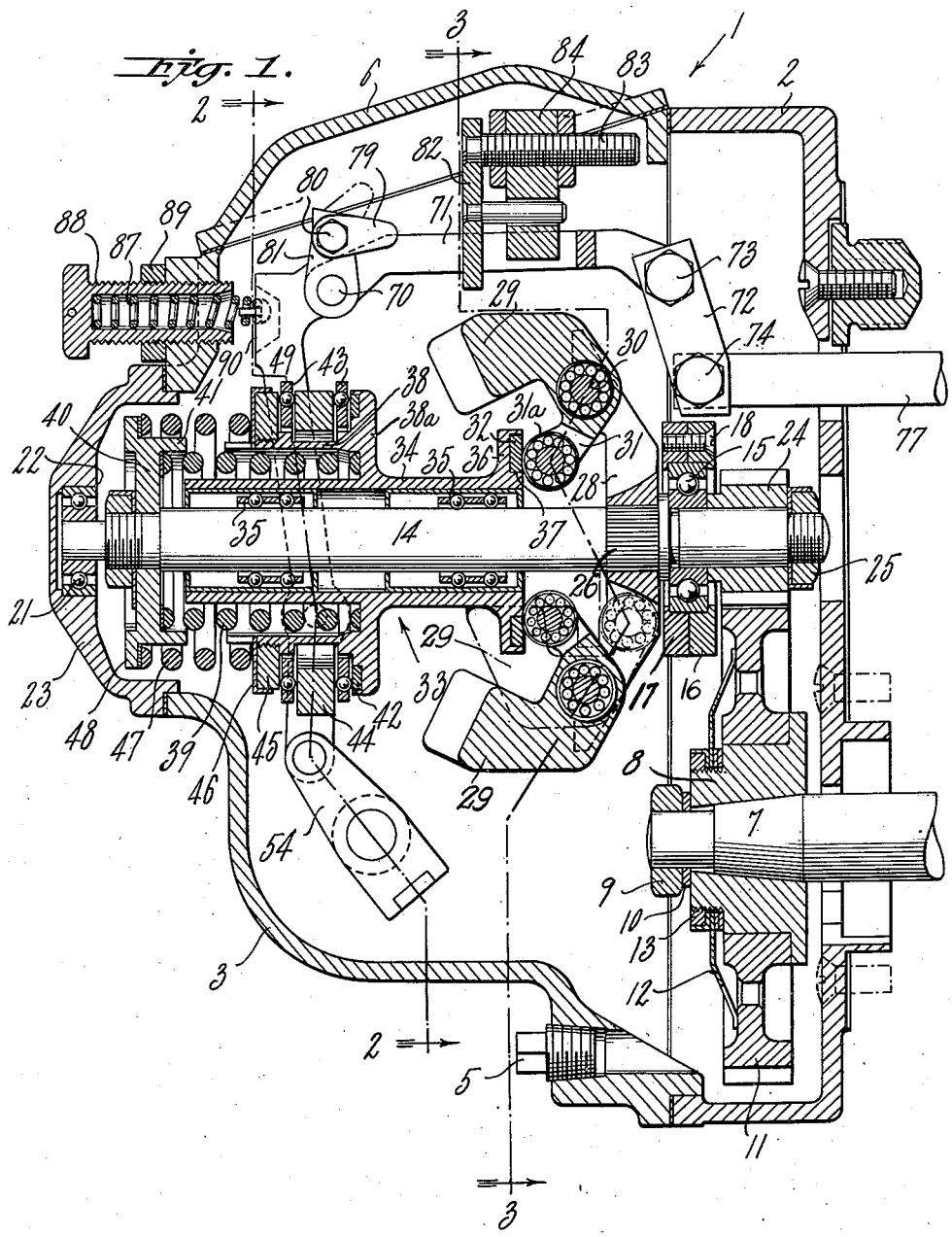
Figure 4:
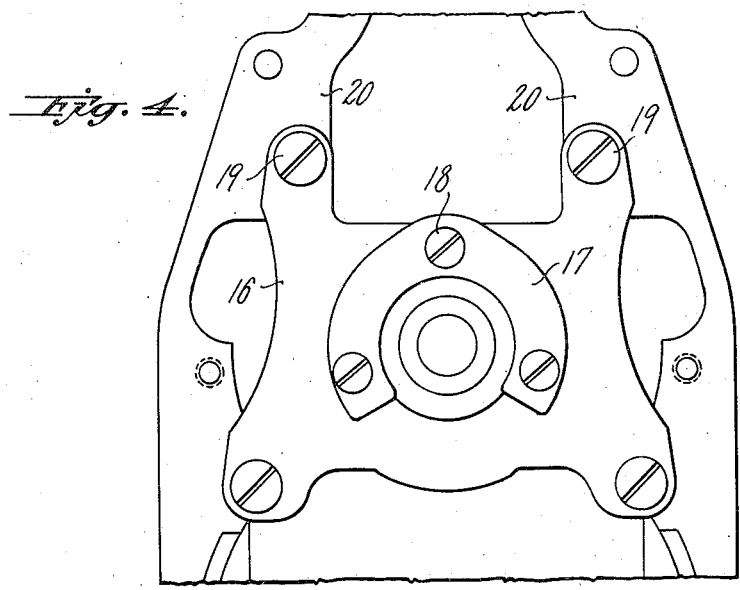
Figure 5:
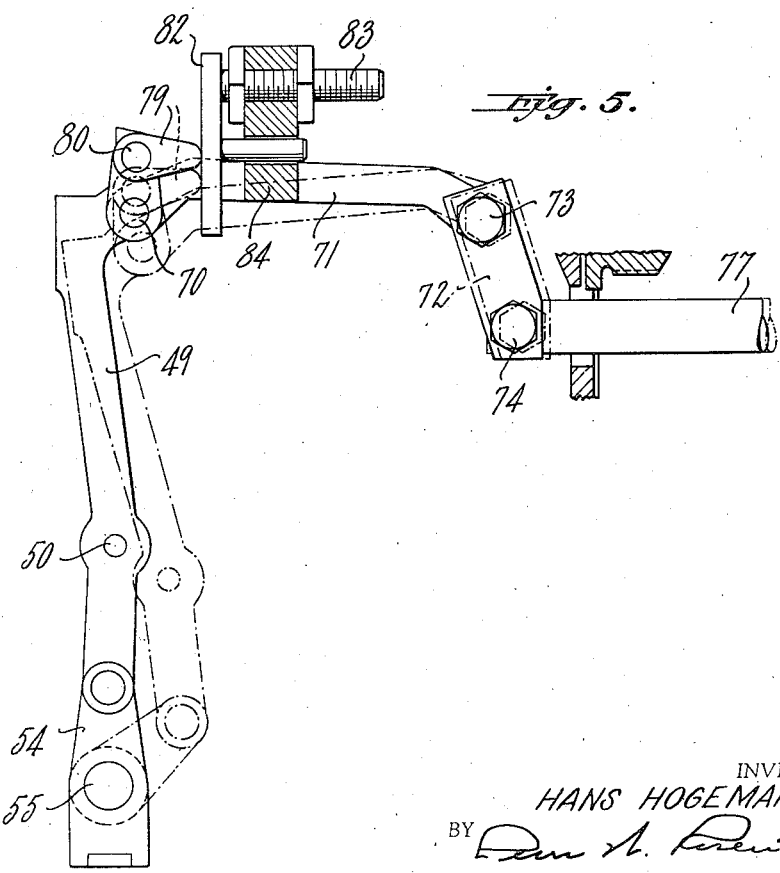
Figures 6, 7:
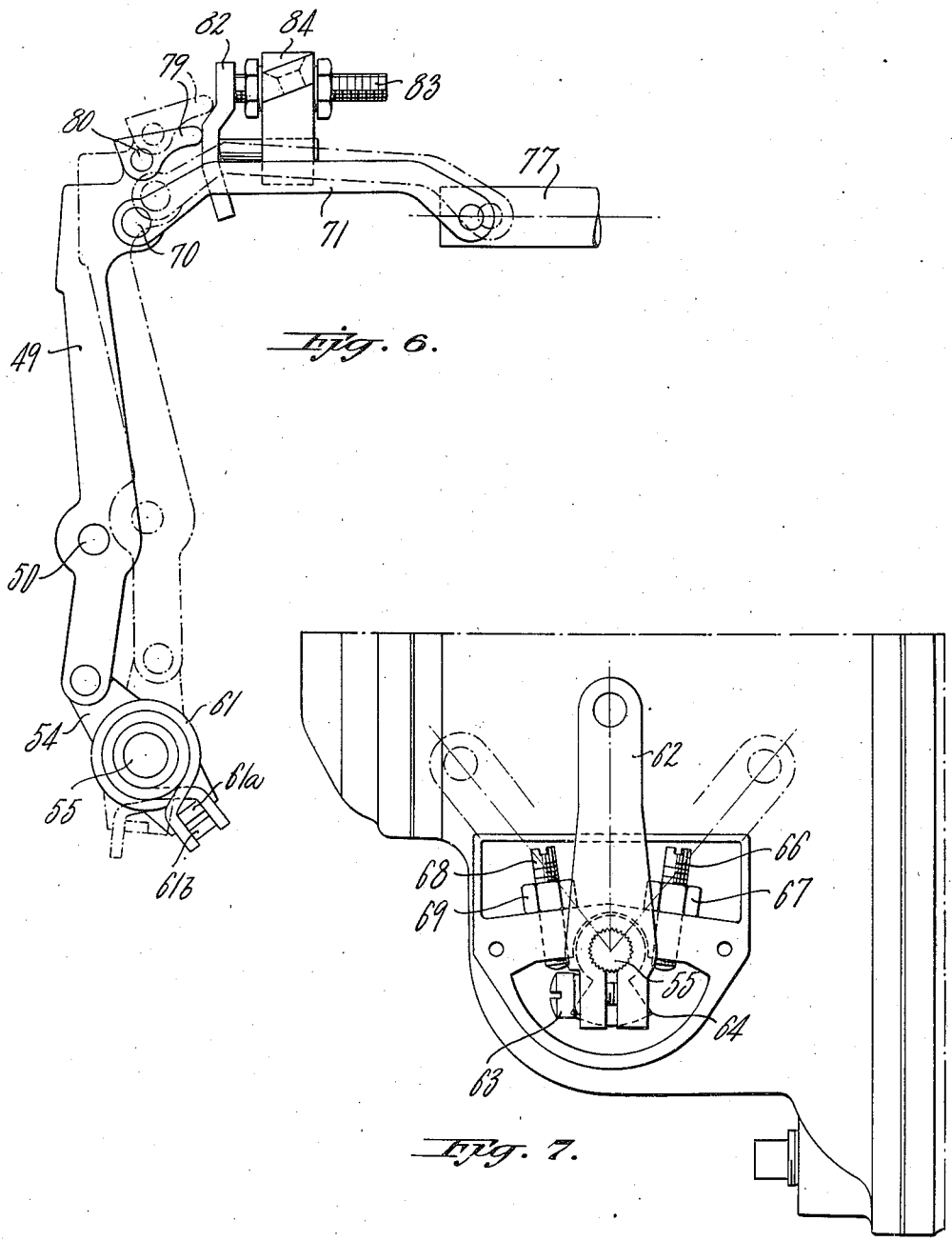

The above and other objects and features of the invention will be apparent to those skilled in the art from a consideration of the following detailed description taken in conjunction with the accompanying drawings in which Fig. 1 represents a longitudinal section through a governor constructed in accordance with the invention; Figs. 2 and 3 are sections on lines 2—2 and 3—3 of Fig. 1; Fig. 4 is a detail showing the bearing support for the governor shaft; Fig. 5 is a view partly diagrammatic illustrating different operative positions of the governor lever and associated parts; Fig. 6 is a view similar to Fig. 5 but showing a modified form; Fig. 7 shows the details of the operating lever and associated parts.

Referring to the drawings, reference number 1 indicates a governor housing which comprises a gear cup 2 having a dish shaped end cover 3 attached thereto by means of machine screws 4. A screw plug 5 in the lower portion of the end cover 3 permits the drainage of lubricant from the casing and a top cap 6 which is removably attached to the upper side of the end cover 3 permits ready access to the interior of the governor housing for the purpose of making certain factory adjustments hereinafter set forth. The governor housing as above described is normally attached to the end of a conventional fuel injection pump, not shown, but a suitable example may be seen in U. S. Patent No. 1,944,858.

The pump shaft is provided with a conical end portion 7 which projects through a suitable opening in the end wall of the gear cup 2 and a hub 8 is rigidly fixed on the conical portion 7 by a nut 9 and a lock washer 10. A drive gear 11 is rotatably mounted upon the hub 8 but is normally held in frictional engagement with the hub 8 by spring disc 12 so that the gear 11 rotates with the hub except under severe variations of torque. The tension of the spring disc 12 may be set by means of an adjusting nut 13 which is screw threaded upon a reduced end of the hub 8, the desired number of spacing washers being placed between the hub and nut. The above described arrangement constitutes a friction drive between the pump shaft and the governor so that sharp variations in speed will be gradually transmitted from the former to the latter. Also any obstruction preventing rotation of the governor shaft will not result in breakage of the parts attached thereto.

A governor shaft 14, mounted above the pump shaft 7, is journaled at one end in a ball bearing 15 which is retained in a bearing bridge 16 by a retaining plate 17 attached to the bridge by screws 18. The bearing bridge 16 is attached by screws 19 to inwardly projecting flanges 20 on the end cover 3.

The opposite end of the shaft 14 is journaled in a ball bearing 21 which is mounted in a recess 22 in a cap 23 detachably secured to the end cover 3. A driving gear 24 meshing with the driving gear 11 is rigidly secured to the end of the shaft 14 projecting beyond the bearing 15 by means of a lock nut 25.

The shaft 14 has a serrated portion 26 adjacent the bearing 15 and upon the opposite side of this bearing from the gear 24. A spider 28 having a central opening 27 is rigidly mounted upon the serrated portion of the shaft 14 by pressing the serrated portion of the shaft through the opening. The spider 28 supports governor weights 29 which are mounted thereon by roller bearing pivots 30. Each weight 29 has an integral arm 31 forked to carry roller bearings 31a which bearings contact with a cam plate 32. This plate is supported by a member 33 which member comprises a sleeve 34 mounted for longitudinal movement upon the governor shaft 14 by means of slide bearings 35. The end of the sleeve 34 adjacent the governor weights 29 is provided with an outwardly extending integral flange 36. This flange is provided with an annular pocket 37 in which is inserted the cam plate 32. At a point approximately midway between the two ends of the sleeve 34, an outwardly extending flange 38a is formed integral with the sleeve 34 and carries a second sleeve 38 extending parallel to and spaced from the sleeve 34. A spring 39 bearing at one end upon the flange 38a and at its opposite end upon a collar 40 is accommodated in the annular space provided between the sleeves 34 and 38. The collar 40 is rigidly attached to the governor shaft 14 adjacent to but spaced from the bearing 21 and is provided with a rim 41 acting as a retainer for the adjacent end of the spring 39. A bearing washer 42 is mounted in a suitable annular groove in the flange 38a and thrust bearings 43 retain a sliding ring 44 between the bearing washer 42 and a nut 45 which is mounted upon a threaded portion of the sleeve 38. The central opening of the slide ring 44 is larger than the external diameter of the sleeve 38, the arrangement being such that lateral and angular movement of the ring relative to the sleeve is permitted while relative longitudinal movement is prevented. Lock washer 46 retains the nut 45 in position and a spring 47 bears at one end against this lock washer, and at its opposite end against a protecting portion 48 of the collar 40.

A governor lever is provided in the form of a yoke 49, the forks of which extend around the governor shaft 14 and each fork is provided with a pivot screw 50 which projects into a bore 51 on the sliding ring 44. This provides a fulcrum for the governor lever having a bearing upon each side of the sliding ring. The forks of the yoke 49 converge below the pivot screws 50 and are pivotally connected by a long pivot pin 53 to a crank 54 which is mounted on and angularly movable relative to a shaft 55. The shaft 55 extends transversely through the lower portion of the end cover 3, is journaled in bearings 56 and has milled ends projecting exteriorly of the end cover upon either side thereof. Oil seals 57 are provided for each of the bearings 56 in the side walls of the cover 3. A sleeve 58 which is fixed to the shaft 55 by a screw 59 carries a spring plate 60 adjacent the crank 54. A torsion spring 61, surrounding the sleeve 58 and retained against a shouldered portion thereof, is so arranged that one of the free ends thereof reacts against a tongue 61a extending laterally from the spring plate 60 while the other free end reacts against a similar tongue 61b projecting from the crank 54 in such a manner as to yieldingly transmit angular motion of the shaft 55 to the crank 54.

An operating lever 62 is clamped to one of the serrated ends of the shaft 55 externally of the end cover 3 by means of a clamp screw 63. The lever 62 may be manually operated in any desired manner for example b ythe usual eccelerator pedal of an automotive vehicle. A stop plate 64 is attached to the serrated portion of shaft 55 and located by a pin 65. An adjusting screw 66 mounted adjacent the stop plate 64 and retained in adjusted position by a lock nut 67 provides an adjustable stop coacting with the stop plate 64 to limit the angular movement of the shaft 55 in a counter-clockwise direction, and a similar screw 68 locked by nut 69 limits the movement of the shaft in the opposite direction.

The upper end of the yoke 49 is connected by a linkage pin 70 to the forked end of a control rod 71 and the opposite end of this link is connected to a clamp 72 having a linkage pin 73 fastened to it. This clamp is fastened to the fuel control rod 77 of a conventional fuel injection pump (not shown) by means of clamping screw 74. It will be understood that the clamp 72 is provided between the link 71 and the control rod 77 in order that the governor may be readily adapted to various sizes or types of the pump mentioned. In some instances the control rod will be in substantial alignment with the link 71 in which case the clamp 72 is omitted and the link 71 attached directly to the control rod.

A smoke limit plate 79 is attached by an adjusting screw 80 to an arm 81 fixed to the yoke 49, and a stop plate 82, positioned between the two forks of the control rod linkage 71, is mounted for adjustment toward or away from the smoke limit plate 79 by an adjusting screw 83. The adjusting screw 83 is mounted upon a bridge 84 which bridge is attached by screws 85 to lugs 86 projecting inwardly from the top cap 6.

A surge spring 87, seated in an adjustable screw plug 88, which may be locked in adjusted positions by means of a lock nut 89, is mounted in the upper outer end of the cover member 3 in which position the free inner end of the surge spring is adjacent a pocket 90 in the upper end of lever 49 to the end that when the lever 49 approaches its limit of movement to the left of the position shown in Figure 1, the surge spring contacts with the lever at a point within the pocket to impose an additional force resisting further movement of the control rod in a fuel decreasing direction. This is to prevent a rapid oscillation of the control rod which is sometimes encountered at high speeds under no load conditions. This surge spring is comparatively stiff and so adjusted that at high idling speed, the spring is just touching the pocket provided in the lever. This not only damps out control rod oscillation at high idling speed but also prevents the engine from stalling at rapid deceleration of the engine since the control rod returns rapidly to the idling position from the shut off position with the help of this spring. The adjustability of the spring permits the setting of a definite speed, within the ability of the governor, for the high idling speed of the engine. At intermediate and low idling speeds, the fulcrum lever 49 moves toward the right leaving a gap between the spring and the lever. If it is desired that the surge spring be effective at the lower idling speeds it may be located higher, that is somewhat above the point where the control link 71 is hinged to the fulcrum lever.

In operation, all of the members associated with the governor shaft 14 rotate therewith except the slide ring 44. These rotating parts include in addition to the spider 28 and governor weights 29, the member 33, the collar 40 and the springs 39 and 47. When the engine is at rest, the flange 36 of the member 33 is in the position shown in dotted lines in the lower half of Figure 1 and the governor weights 29 are accordingly also in the position shown in dotted lines in this figure. In this rest position preferably but one of the springs 39 and 47 is acting upon the member 33 to govern the lower speed and to maintain the same in this position the other coming into action only after some movement of the member 33 to the left.

Upon starting the engine the governor shaft 14 and the associated parts are rotated through the friction drive previously described. The governor weights 29 move outward forcing the roller bearings 31a against the cam plate 32 thereby forcing the member 33 to the left against the action of one of the springs and then against the action of both springs. This movement of the member 33 is transmitted by the slide ring 44 acting through the pivots 50 to the lever 49, and this lever acting through the link 71 and the clamp 72 draws the fuel control rod 77 to the left, that is in a direction to decrease the quantity of fuel supplied to the engine. For a definite speed the sleeve 33 assumes a definite position corresponding to the engine speed in which the springs pressing against the sleeve balance the opposing forces of the governor weights. If, due to an increase in load on the engine, the speed decreases somewhat, the sleeve 33 moves toward the injection pump and the fulcrum lever is tilted around the lower pivot point formed by the pivot pin 53 thereby moving the control rod toward the injection pump and increasing the fuel delivery to the engine until a new balance point is established where the correct fuel delivery is obtained for the corresponding increased load. When on the other hand, the engine load is decreased, the speed increases somewhat and the sleeve moves outward, away from the injection pump and the lever 49 tilts outward moving the control rod to the left and thus decreasing the fuel delivery in accordance with the decreased engine load. In this way the speed of the engine is maintained within certain limits regardless of the engine load as long as the engine is not overloaded.

The engine speed is changed by means of the operating lever 62. If an increased engine speed is required the operating lever 62 is turned so that the crank 54 is moved outwardly carrying the lower pivot 53 of the lever 49 outward. This tilts the lever, using the intermediate pivots 50 as a fulcrum and moves the control rod 77 momentarily toward the right, that is in the direction of an increased fuel supply, resulting in increased engine speed. This increase in engine speed immediately moves the member 33 and with it the fulcrum lever and the connected control rod into the position corresponding to the new desired speed. If the engine speed is to be decreased, the movements are reversed.

Over-loading of the engine which would result in smoky exhaust is prevented by the stop plate 82 which is so adjusted that the smoke limit plate or cam 79 on the fulcrum lever 49 just touches this stop plate at full speed and full load. This determines the maximum fuel delivery at full speed. However, since it is possible for the engine to burn somewhat more fuel at decreased speeds without smoky exhaust due to the increased volumetric efficiency of the engine at lower speeds, the control rod 77 can move somewhat further toward the right, that is in the direction of increased fuel supply at lower engine speeds. This is due to the fact that as the engine speed decreases at a time when the cam 79 is in contact with the plate 82, the springs 39 and 47 continue to press the member 33 to the right and the lever 49 is now also moved to the right pivoting upon the point of contact between the cam 79 and the plate 82. This pivoting of the lever about this point is permitted even though the control rod 62 is held rigid in its full speed position for the crank 54 may rotate in a clock-wise direction even though the lever 62 is in a fixed position due to the resilient connection between these parts provided by the spring 61. The extent to which the fuel supply may be increased in this manner is dependent upon the leverage provided by the distance between the point of contact of plates 79 and 82 and the pivot point formed by the pin 70 connecting the lever 49 with the link 71. This distance is of course small but only small increases are permitted in the quantity of fuel supplied to the engine under these conditions for material decreases in speed. However, this increase in the fuel supply, which may be adjusted to correspond fully to that permitted by the increased volumetric efficiency of the engine at the reduced speeds, is sufficient to increase the torque of the engine at low engine speeds and improve its lugging power which is desirable for many Diesel engine applications.

The torque increase at lower speeds is adjustable within reasonable limits by adjusting cam 79 upon the fulcrum lever by means of adjusting screw 80. The higher the cam is turned the more torque increase is obtained and the lower the cam is turned the less torque increase is obtained.

The surface of the stop plate 82 need not be flat but may be given such a contour that the cam 79 will contact therewith along a sloping surface to move the fuel control rod 77 in accordance with some predetermined torque curve of the engine. Thus, if the cam 79 contacts the outermost portion of such a surface when the engine is running at normal full load, as shown in full lines in Fig. 6, then upon decreased speed the cam 79 will ride high upon the plate 82 as shown in dotted lines in Figure 6. The increased fuel supplied under these circumstances is due in part to the inward movement of the lever 49 permitted by the shape of the stop plate and in part to the lever action previously described.

From the above description other embodiments of the invention will be obvious to those skilled in the art.

Having thus described the invention, what is claimed is:

1. A speed regulator including a governor, a lever acted upon by said governor at a point intermediate its length, a fuel control member connected to said lever adjacent one end thereof, a member adapted to stop movement of said fuel control member at normal full load position thereof, and a yieldable pivot for said lever arranged adjacent the opposite end of said lever.

2. A speed regulator including a governor, a member movable in response to said governor, a lever pivoted intermediate its length to said member, a fuel control member connected to said lever on one side of the pivot thereof, a member adapted to stop movement of said control member at normal full load position thereof, and a yieldable pivot for said lever arranged on the other side of said lever.

3. A speed regulator including a governor shaft, a governor mounted upon said shaft, a member mounted upon said shaft for longitudinal movement thereon in response to said governor, a collar mounted upon said member, a lever pivoted intermediate its length upon said collar, a fuel control member pivotally connected to one end of said lever, a member adapted to stop movement of said end of said lever at normal full load position of said control member, and a yieldable pivot for the opposite end of said lever.

4. A speed regulator including a governor shaft, a centrifugal governor mounted upon said shaft, a member mounted upon said shaft for longitudinal movement thereon in response to said governor, a collar rotatively mounted with a lost motion connection upon said member, a lever pivoted intermediate its length upon said collar, a fuel control member pivotally connected to one end of said lever, a member adapted to stop movement of said end of said lever at normal full load position of said control member, and a yieldable pivot for the opposite end of said lever.

5. A speed regulator including a governor shaft, a centrifugal governor mounted upon said shaft, a member mounted upon said shaft for longitudinal movement thereon in response to said governor, a collar rotatively mounted with a lost motion connection upon said member, a lever pivoted intermediate its length upon said collar, a fuel control member pivotally connected to one end of said lever, a crank pivoted to the opposite end of said lever, a shaft pivotally supporting said crank, and resilient means for transmitting angular motion of said last named shaft to said crank.

6. A speed regulator for controlling the fuel supply to an internal combustion engine including a speed responsive device, a lever acted upon by said speed responsive device at a point intermediate its length, a pivot about which said lever rotates during periods of normal engine load, a stop member associated with a portion of said lever spaced from said pivot and about which said lever moves during periods of overload, and a fuel control member operable by said lever, said pivot and control member being associated with said lever on opposite sides of said point.

7. A speed regulator for controlling the fuel supply to an internal combustion engine including a speed responsive device, a lever acted upon by said speed responsive device at a point intermediate its length, a pivot about which said lever rotates during periods of normal engine load, means for yieldingly mounting said pivot, a stop member associated with a portion of said lever spaced from said pivot and about which said lever moves during periods of overload, and a fuel control member operable by said lever, said pivot and control member being associated with said lever on opposite sides of said point.

8. A speed regulator for controlling the fuel supply to an internal combustion engine including a speed responsive device, a lever acted upon by said speed responsive device at a point intermediate its length, a pivot about which said lever rotates during periods of normal engine load, means for yieldingly mounting said pivot in adjustable positions, an adjustable stop member associated with a portion of said lever spaced from said pivot and about which said lever moves during periods of overload, and a fuel control member operable by said lever, said pivot and control member being associated with said lever on opposite sides of said point.

9. A speed regulator for controlling the fuel supply to an internal combustion engine including a governor shaft, a centrifugal governor mounted upon said shaft, a member mounted upon said shaft for rotation therewith and for longitudinal movement thereon in response to said governor, a collar rotatively mounted with a lost motion connection upon said member, a lever pivoted intermediate its length upon said collar, a fuel control member pivoted to one end of said lever, a fixed stop adjacent said end of said lever, means associated with said lever adapted to contact said stop after motion of said lever for a predetermined distance in a fuel increasing direction, a crank pivoted to the opposite end of said lever, a shaft pivotally supporting said crank, and resilient means for transmitting angular motion of said shaft to said lever whereby said lever swings about one end as a pivot during normal load conditions and about its other end as a pivot during overload conditions.

10. A speed regulator including a governor shaft, a centrifugal governor mounted upon said shaft, a member mounted upon said shaft for longitudinal movement thereon in response to said governor, a collar mounted with a lost motion connection upon said member, a lever pivoted intermediate its length upon said collar, a fuel control member pivotally connected to said lever on one side of its pivot, a member adapted to stop movement of said lever at normal full load position of said control member, and a yieldable pivot for said lever on the opposite side of said first named pivot.

11. A speed regulator for controlling the fuel supply to an internal combustion engine including a governor shaft, a governor mounted upon said shaft, a member mounted on said shaft for longitudinal movement thereon in response to said governor, a collar mounted with a lost motion connection upon said member, a lever pivoted intermediate its length upon said collar, a fuel control member pivoted to said lever at one side of its pivot, a fixed stop adjacent said lever on the same side of said pivot, means associated with said lever adapted to contact with said stop after motion of said lever for a predetermined distance in a fuel increasing direction, a crank pivoted to said opposite side of its pivot, a shaft pivotally supporting said crank, and resilient means for transmitting angular motion of said shaft to said lever, whereby said lever swings about one end as a pivot during normal load conditions and moves about its other end during full load conditions.

HANS HOGEMAN.